US008000418B2

(12) United States Patent
Jin

(10) Patent No.: US 8,000,418 B2
(45) Date of Patent: *Aug. 16, 2011

(54) METHOD AND SYSTEM FOR IMPROVING ROBUSTNESS OF INTERFERENCE NULLING FOR ANTENNA ARRAYS

(75) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 984 days.

This patent is subject to a terminal disclaimer.

(21) Appl. No.: 11/654,941

(22) Filed: Jan. 18, 2007

(65) Prior Publication Data

US 2008/0039146 A1 Feb. 14, 2008

Related U.S. Application Data

(60) Provisional application No. 60/836,720, filed on Aug. 10, 2006.

(51) Int. Cl.
*H04B 7/10* (2006.01)
*H04L 1/02* (2006.01)

(52) U.S. Cl. ...................... 375/347; 455/562.1; 342/368

(58) Field of Classification Search .................... 455/73, 455/550.1, 561, 562.1; 375/316, 346–347, 375/350; 342/22 R, 25 A, 25 F, 73, 74, 81, 342/147, 149, 151, 154, 157, 350, 352, 354, 342/367, 368, 373, 381, 384
See application file for complete search history.

(56) References Cited

U.S. PATENT DOCUMENTS

| | | | | |
|---|---|---|---|---|
| 6,931,362 | B2 | 8/2005 | Beadle et al. | 702/190 |
| 7,054,292 | B2 | 5/2006 | Hall et al. | 370/334 |
| 7,450,673 | B2 * | 11/2008 | Jin et al. | 375/347 |
| 2003/0190897 | A1 | 10/2003 | Lei et al. | 455/101 |
| 2004/0146024 | A1 | 7/2004 | Li et al. | 370/334 |
| 2005/0001765 | A1 | 1/2005 | Ryu et al. | 342/377 |
| 2005/0101354 | A1 | 5/2005 | Yang | 455/562.1 |
| 2006/0079289 | A1 * | 4/2006 | Lewis | 455/562.1 |
| 2007/0015545 | A1 * | 1/2007 | Leifer et al. | 455/562.1 |

* cited by examiner

*Primary Examiner* — Dac V Ha
*Assistant Examiner* — James M Perez

(57) ABSTRACT

A method and system are provided for improving the robustness of interference nulling for antenna arrays in a wireless communication network. The method is comprised of generating a first interference spatial signature from an interference signal matrix received by the antenna array, deriving a second interference spatial signature from the first interference spatial signature, calculating a covariance matrix from the second interference spatial signature, and generating a beamforming weighting vector from the covariance matrix.

19 Claims, 7 Drawing Sheets

200

METHOD AND SYSTEM FOR IMPROVING ROBUSTNESS OF INTERFERENCE NULLING FOR ANTENNA ARRAYS

CROSS REFERENCE

The present application claims the benefit of U.S. Provisional Application Ser. 60/836,720, which was filed on Aug. 10, 2006.

BACKGROUND

Interference is one of the factors that may impair the performance of a wireless communication network. Interference reduces the capacity of a wireless communication channel and causes problems such as dropped calls, reduced data rates, etc.

It is common for wireless communication network designers to develop a method to mitigate interference. The most commonly used approaches include underutilizing communication channels, limiting the number of users in a communication network, and reducing the coverage area of a cell. In essence, conventional methods trade spectrum efficiency for better performance of a wireless communication network. As a result, it takes longer for a wireless communication network service provider to recover the investment in a wireless communication network.

In a wireless communication network, a base transceiver station (BTS) equipped with an antenna array has the facility to shape its antenna beam pattern. By applying a set of beamforming weighting vectors to the antenna array, the BTS can create a directional beam steered toward a specific customer premises equipment (CPE) to increase the strength of a signal.

The same technique can be adopted to mitigate interference in a wireless communication network. The nulling angle of an antenna beam pattern could be placed toward the interference direction of arrival (DOA), while most of the gain on the beam is still maintained in the direction of the CPE. As a result, the strength of an interference signal is diminished to the point that it has less or no effect on the wireless communication network. This approach is commonly known as interference nulling for antenna arrays.

In a wireless communication network that employs interference nulling for antenna arrays, a beamforming weighting vector w of an antenna array is determined based on the following eigenvalue equation: $(R_i+\sigma_n^2 I)^{-1}R_s\cdot w=\lambda w$ (1), where $R_i$ is the covariance matrix calculated from interference signals; $\sigma_n$ is the standard deviation of channel noises; $R_s$ is the covariance matrix calculated from the desired signals; I is the identity matrix; $\lambda$ is the maximum eigenvalue. This is often referred to as an eigenvalue beamforming/interference suppression method.

The interference covariance matrix in equation 1 describes interference DOA. Since the beamforming weighting vector calculated from equation 1 takes the interference DOA into consideration, the antenna beam pattern is rotated properly. In other words, by applying the beamforming weighting vector to the antenna array on the BTS, the antenna beam pattern is rotated, with the nulling angle repositioned toward the interference DOA. Conventionally, an interference covariance matrix is determined by the spatial signatures of interference signals.

FIG. 1 is a diagram that depicts an antenna beam pattern and interference DOA in an ideal environment. A dominant beam 110 is shown as a lobe in the antenna beam pattern. Signal DOA 120 and interference DOA 130 are shown as a straight line. A nulling angle 140 is positioned toward the interference DOA 130. Since the interference DOA 130 falls within the nulling angle 140, the strength of the interference signal is greatly reduced. As illustrated in FIG. 1, the null is located at the very steep slope of an antenna beam pattern.

FIG. 2A is a diagram that depicts an antenna beam pattern and interference DOA in an actual environment. Interference DOA 220 falls within a dominant beam 210 of the antenna beam pattern. As a result, interference signals reduce the signal to noise ratio of the CPE.

FIG. 2B is a diagram that depicts an antenna beam pattern with conventional interference nulling of antenna arrays. It shows a scenario in which interference DOA 220 remains within a dominant beam 212 after the antenna beam pattern is rotated by a rotation angle 240. A small degree of error in the interference covariance matrix reduces the accuracy of the beamforming weighting vector, which in turn leads to an incorrect rotation angle so that the nulling angle misses the interference DOA. In this scenario, the performance of the wireless communication network is degraded.

As such, what is desired is a method and system for improving an interference covariance matrix, used in an interference nulling method, which will produce a more effective beamforming weighting vector that yields a wider nulling angle. A wider nulling angle makes an antenna beam pattern less susceptible to an error in the interference covariance matrix.

SUMMARY

A method and system are provided for improving the robustness of interference nulling for antenna arrays in a wireless communication network. The method comprises generating a first interference spatial signature from an interference signal matrix received by the antenna array, deriving a second interference spatial signature from the first interference spatial signature, calculating a covariance matrix from the second interference spatial signature, and generating a beamforming weighting vector from the covariance matrix.

DESCRIPTION

A method and system are provided for improving the robustness of interference nulling for antenna arrays in a wireless communication network. The method and system generates an interference covariance matrix that is used to calculate a more robust beamforming weighting vector for an antenna array.

In a conventional method, an interference covariance matrix is directly derived from the interference spatial signatures of a CPE. However, in the method disclosed herein, an interference covariance matrix is derived from the derivative interference spatial signatures, which are generated from the interference spatial signatures of a CPE. The derivative interference spatial signatures can be viewed as a set of predicted interference spatial signatures of a CPE.

Figure 3:
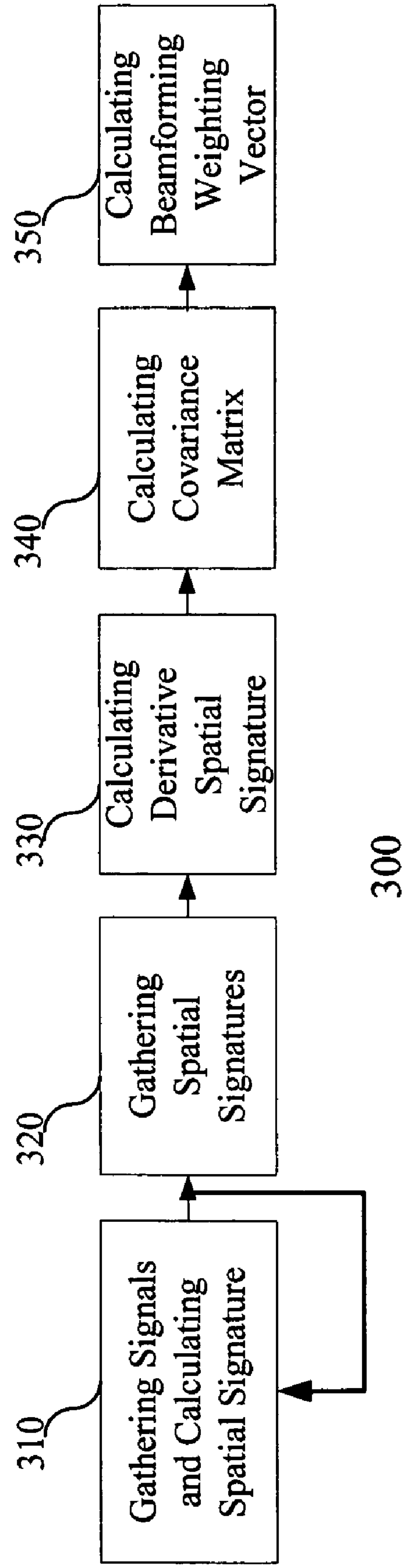
FIG. 3 is a flow diagram illustrating a method for generating a beamforming weighting vector in accordance with one embodiment.

FIG. 3 is a flow diagram illustrating a method for generating a beamforming weighting vector for interference nulling in accordance with one embodiment. In step 310, a BTS with m antennas in a wireless communication network receives interference signals in n receiving periods.

Each of the m antennas on the BTS receives an interference signal $s_{ij}$ at time i, where j ∈(1, . . . m). Let $$Y_i = \begin{bmatrix} s_{i1} \\ s_{i2} \\ \vdots \\ s_{im} \end{bmatrix}$$

be a vector representing the receiving interference signals for all m antennas at time i. A receiving interference signal matrix Y has vector elements $(Y_1, Y_2, \ldots, Y_n)$ and $Y=(Y_1, Y_2, \ldots, Y_n)$.

An interference spatial signature V' of the CPE is calculated from the receiving interference signal matrix Y with a common algorithm. Step 310 is repeated continuously over time for constantly monitoring interference signals in the wireless communication network.

In step 320, the BTS records the last l interference spatial signatures generated in step 310. Let $V_R$ be a matrix with vector elements $(V_1', V_2', \ldots, V_l')$ and $V_R=(V_1', V_2', \ldots, V_l')$ represents an interference spatial signature matrix, wherein $V_i'$ is the i-th spatial signature.

In Step 330, a set of m interference derivative spatial signatures is created from the interference spatial signature matrix $V_R$ to produce a matrix W according to one of the two methods described in FIG. 5 and FIG. 6 below.

In step 340, an interference covariance matrix is calculated from the matrix W with any known algorithm.

In Step 350, a beamforming weighting vector of the CPE, based on interference nulling for antenna arrays, is generated with the interference covariance matrix. The beamforming weighting vector is applied to the antenna array to create an antenna beam pattern whose nulling angle is wider than that of an antenna beam pattern created using a conventional interference nulling method.

Figure 1:
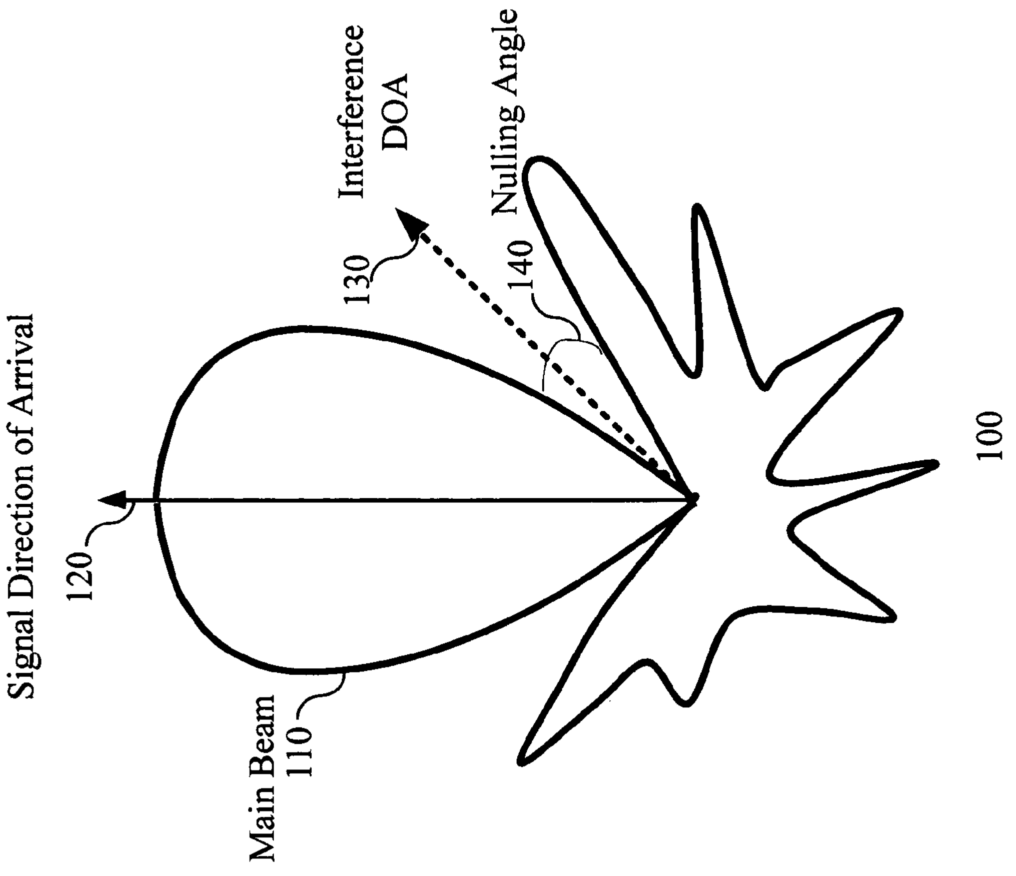
FIG. 1 (Prior Art)
FIG. 1 is a diagram illustrating an antenna beam pattern and interference DOA in an ideal environment.
Figure 2A:
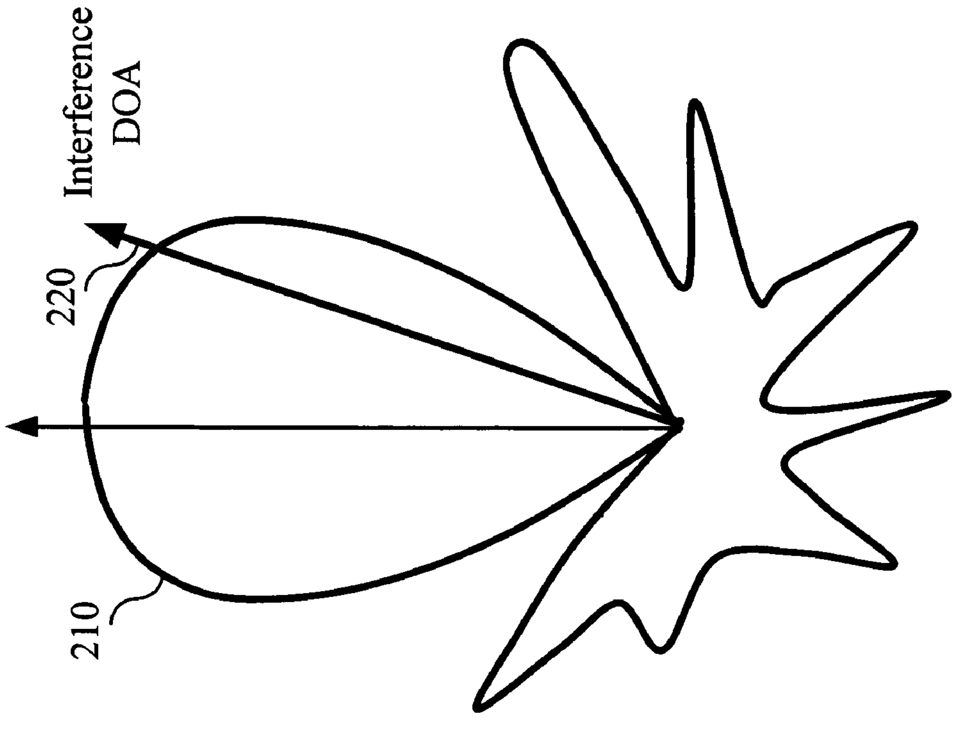
FIG. 2A is a diagram illustrating an antenna beam pattern and interference DOA in an actual environment.
Figure 2B:
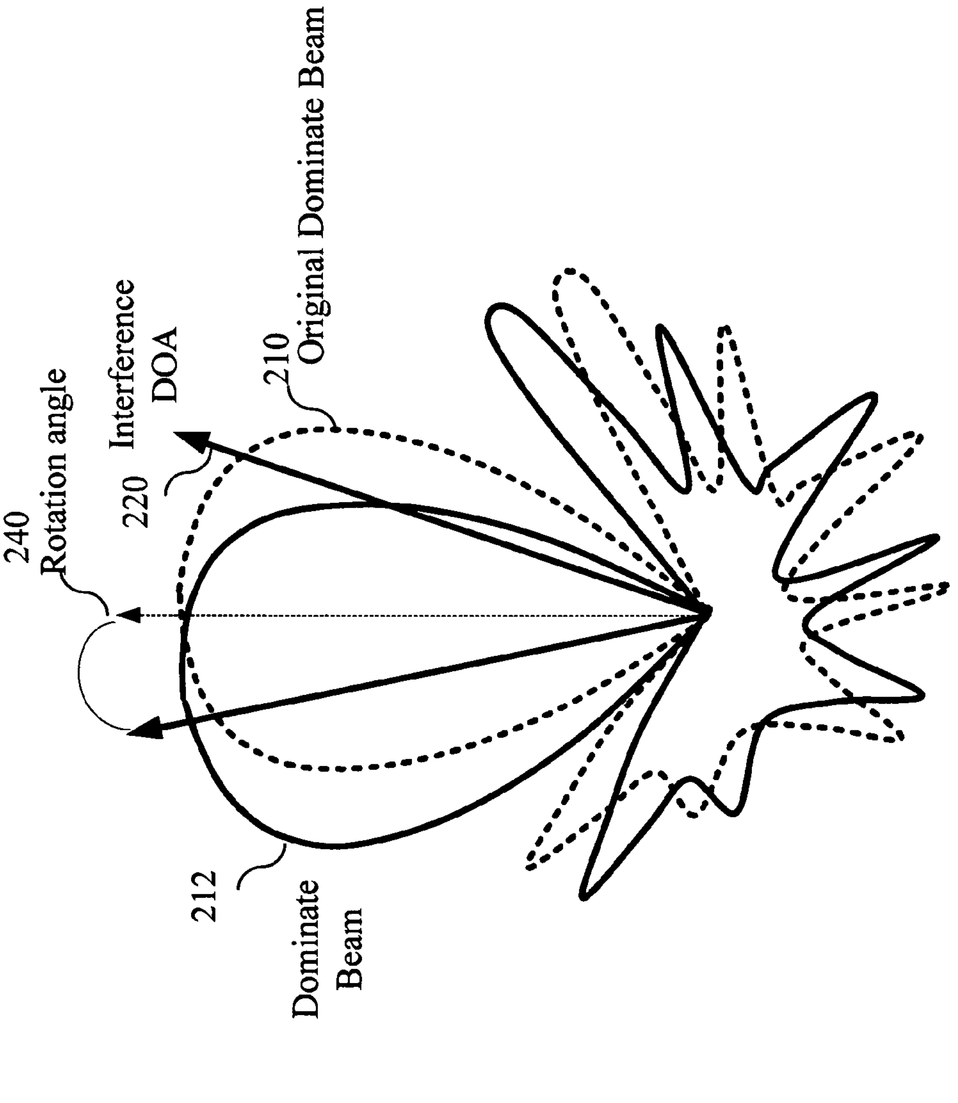
FIG. 2B (Prior Art)
FIG. 2B is a diagram illustrating an antenna beam pattern and interference DOA after a beamforming weighting vector is applied to an antenna array.
Figure 4:
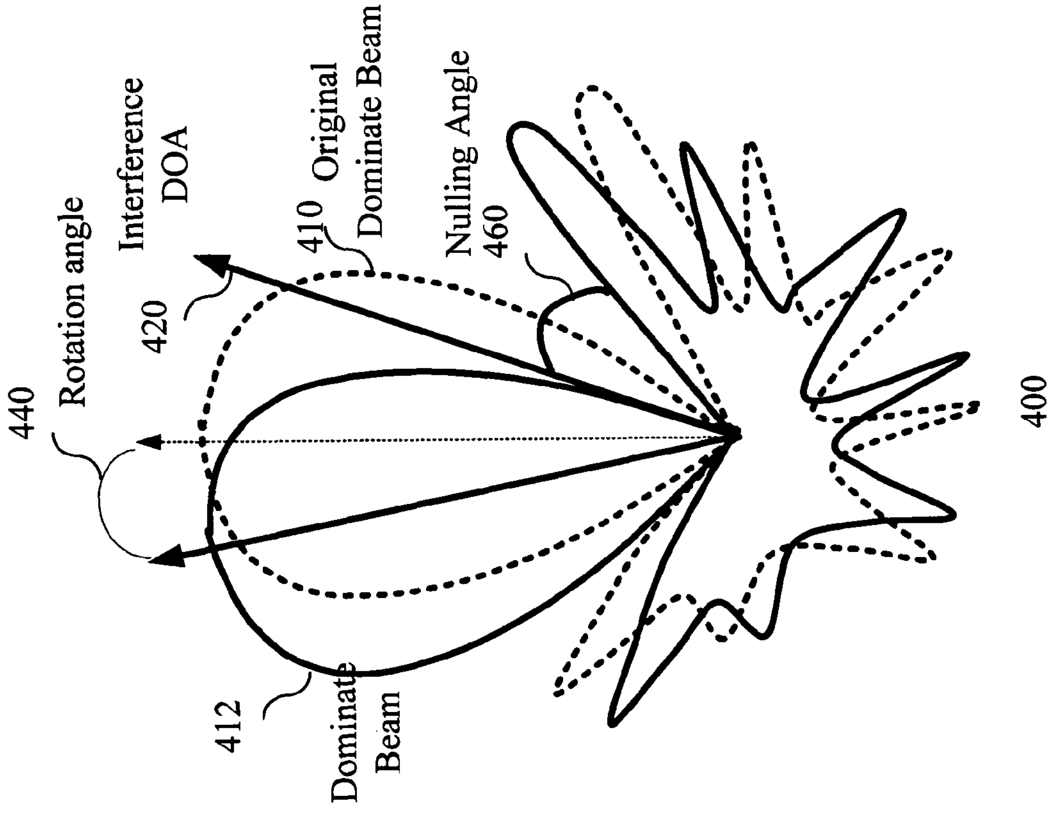
FIG. 4 is a diagram that depicts an antenna beam pattern using an interference nulling method disclosed in the present invention.

FIG. 4 is a diagram that depicts an antenna beam pattern using the interference nulling method according to the embodiment of the present invention described above. A dominant beam 412 represents a dominant beam 410 after it is rotated by a rotation angle 440 in accordance with the beamforming weighting vector created by the method disclosed in the present invention. FIG. 4 shows a scenario in which interference DOA 420 falls outside the dominant beam 412 because a nulling angle 460 is wider than one created by a conventional method; for example, the nulling angle depicted in FIG. 1.

When a nulling angle around interference DOA is wider, a small degree of error in the interference covariance matrix will not severely impact the efficiency of an interference nulling method because the interference DOA will fall within the wider span of the nulling angle.

Figure 5:
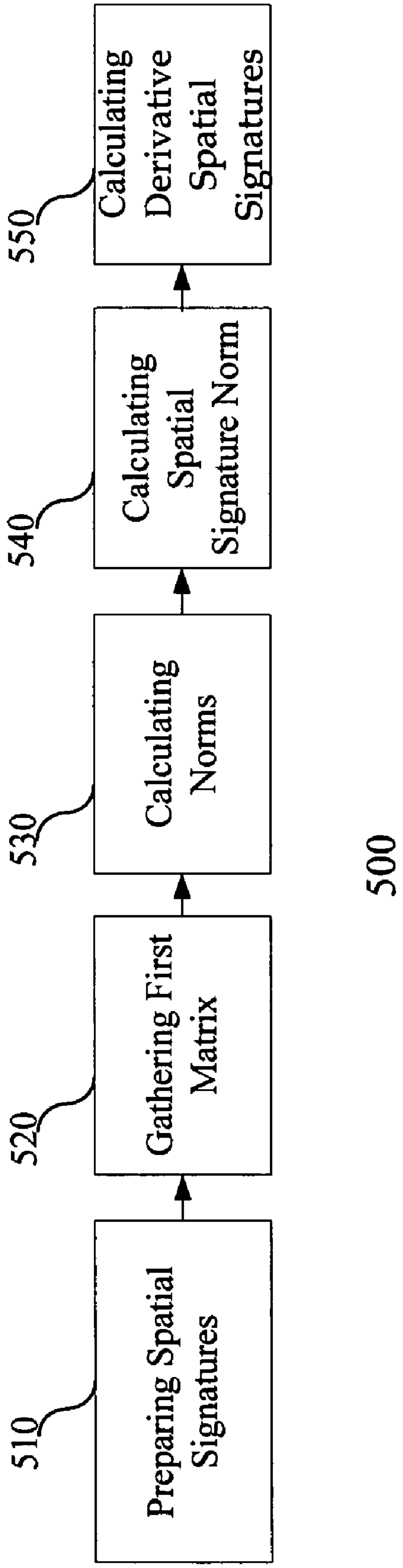
FIG. 5 is a flow diagram illustrating a first technique to obtain a set of interference derivative spatial signatures.

FIG. 5 is a flow diagram illustrating a first technique to obtain a set of interference derivative spatial signatures. In step 510, a set of I interference spatial signatures is generated. (See steps 310 and 320 of FIG. 3 regarding interference spatial signatures.)

In step 520, a matrix $V_D$ is calculated. Each vector element of the matrix $V_D$ is the delta vector of two consecutive interference spatial signatures, i.e., $V'_D=(V'_{i+1}-V'_1)$ and $V_D=(V'_2-V'_1 \ldots, V'_i-V'_{i-1} \ldots, V'_l-V'_{l-1})$, where i ∈{2, . . . ,l).

In step 530, a norm of each vector element in the matrix $V_D$ is calculated according to the following equation: $\Delta_i=\|V'_{i+1}-V'_i\|$, where $\Delta_i$ is the norm of the delta vector of two consecutive interference spatial signatures in $V_R$.

In step 540, interference spatial signature norm Δ is the average of $\Delta_i$ and is calculated according to the following equation:

$$\Delta = \frac{\sum_{i=2}^{l} \Delta_i}{l-1}.$$

In step 550, an optimization process is employed to calculate a set of m interference derivative spatial signatures, which are the vector elements of a matrix $V_M$, where $V_M=(V_1, \ldots, V_j, \ldots, V_m)$ and j ∈{1, . . . ,m). The number of interference derivative spatial signatures is predetermined according to the requirements of the wireless communication network. The interference derivative spatial signature vectors must satisfy the following three criteria.

First, the norm of each interference derivative spatial signature $V_i$ must be equal to 1, i.e., $\|V_i\|=1$, where i ∈{1, . . . ,m). Second, for every interference derivative spatial signature $V_i$, where i ∈{1, . . . ,m), the Euclidian distance from every $V_i$ to the last calculated interference spatial signature $V_l'$ in step 320 of FIG. 3 is equal to the interference spatial signature norm Δ, i.e., $\|V_i-V_l'\|=\Delta$, where i ∈{1, . . . ,m).

Third, since it is possible that more than one set of interference derivative spatial signatures will satisfy the first and second criteria, the set of interference derivative spatial signatures that are spread most evenly over the two-dimensional space is selected. Namely, the set of $V_i$ with the maximum Euclidian distance between $V_i$ and the rest of $V_j$s, where j ∈{1, . . . ,m) and i≠j according to the equation $$\sum_{i=1}^{m} \sum_{j=1, j\neq i}^{m} \|V_i - V_j\|$$

is selected to be the interference derivative spatial signatures that will be used to calculate the interference covariance matrix.

Figure 6:
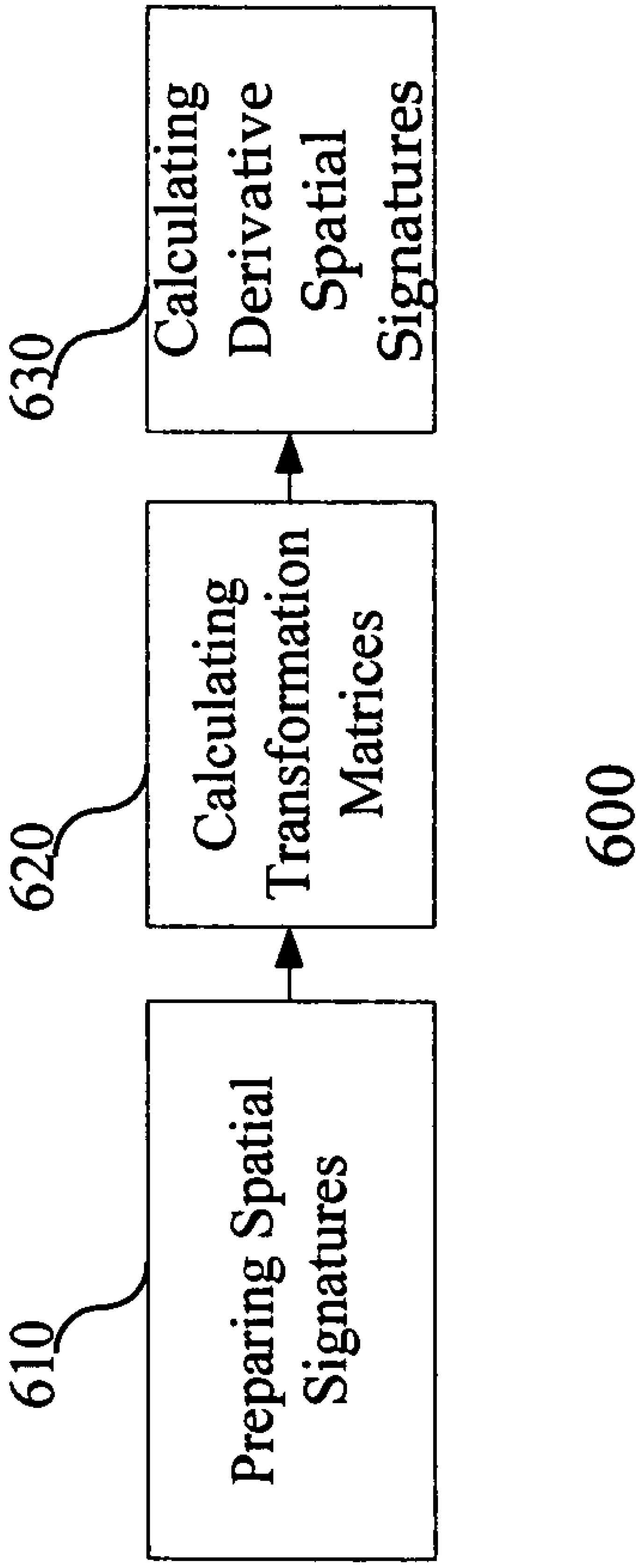
FIG. 6 is a flow diagram illustrating a second technique to obtain a set of interference derivative spatial signatures.

FIG. 6 is a flow diagram illustrating a second way to obtain a set of interference derivative spatial signatures.

In step 610, a set of 1 interference spatial signatures is generated. (See steps 310 and 320 of FIG. 3 regarding interference spatial signatures.)

In step 620, l−1 interference transformation matrices $T_i$ are calculated according to the following equation: $T_{i-1}{}^{*}V_{i-1}'=V_i'$, where i ∈{2, . . . ,l) and $T_i$ is the interference transformation matrix that maps $V_{i-1}'$ to $V_i'$.

In step 630, an optimization process is employed to calculate a set of m interference derivative spatial signatures and creates a matrix $V_M$, $V_M=(V_1, \ldots, V_j, \ldots, V_m)$ and $j \in \{1, \ldots, m)$ according to the following equation: $V_i=T_i*V_l'$, where $i \in \{2, \ldots, l)$ and $m \leqq l-1$ and $V_l'$ is the last calculated interference spatial signature. The number of interference derivative spatial signatures is predetermined according to the requirements of the wireless communication network.

The method disclosed herein creates a set of interference derivative spatial signatures from the interference spatial signatures calculated using a conventional method. An interference covariance matrix generated from the interference derivative spatial signatures produces a beamforming weighting vector that results in an antenna beam pattern with a wider nulling angle, which improves the robustness of an interference nulling method.

The above description is intended by way of example only.

What is claimed is:

1. A method comprising:

at a wireless communications device, receiving signals at an antenna array and generating a first interference spatial signature from an interference signal matrix derived from interference signals received by the antenna array;

deriving a second interference spatial signature from the first interference spatial signature based on differences between consecutive vectors of the interference signal matrix;

calculating a covariance matrix from the second interference spatial signature; and generating a beamforming weighting vector from the covariance matrix, wherein the beamforming weight vector is for use with the antenna array of the wireless communication device to null interference represented by the first interference spatial signature.

2. The method of claim 1, wherein deriving the second interference spatial signature comprises:

generating two or more second vectors, each of which is a difference between two consecutive first vectors of the interference signal matrix;

calculating two or more norms of the two or more second vectors and an interference spatial signature norm which is an average of the two or more norms; and generating the second interference spatial signature from the two or more norms of the two or more second vectors and the interference spatial signature norm.

3. The method of claim 2, wherein a set of the second vectors has one fewer element than a set of the first vectors.

4. The method of claim 2, wherein one of the first vectors is the last interference spatial signature generated by the wireless communication device.

5. The method of claim 2, wherein selecting the set of third vectors that are most evenly spread over the two-dimensional space comprises selecting the set of third vectors with the maximum Euclidian distance between each vector and the rest of the two or more third vectors calculated as $$\sum_{i=1}^{m} \sum_{j=1, j \neq i}^{m} \|V_i - V_j\|,$$

wnere $V_i$ represents the two or more third vectors.

6. The method of claim 2, wherein deriving the second interference spatial signature further comprises:

generating at least one set of two or more third vectors of interference derivative spatial signatures employing vector operations and forming a first matrix of two or more third vectors such that the norm of each third vector equals one and the norm of the difference between each third vector and one of the first vectors equals the interference spatial signature norm; and selecting a set of third vectors which are most evenly spread over a two-dimensional space.

7. The method of claim 1, wherein generating the beamforming weight vector comprises generating the beamforming weight vector to produce a beam pattern having a dominant beam rotated by a rotation angle such that a nulling angle of the beam pattern is sufficiently wide to ensure that a direction of arrival of the interference signals falls outside the dominant beam.

8. An apparatus comprising:

a receiver configured to receive signals detected at a plurality of antennas that are transmitted by a customer premises equipment over time;

a signal processing module coupled to the receiver, the signal processing module configured to:

calculate one or more first interference spatial signatures from an interference signal matrix derived from interference signals received at the plurality of antennas;

derive a second interference spatial signature from the first interference spatial signature based on differences between consecutive vectors of the interference signal matrix; and calculate a covariance matrix from the second interference spatial signature and to compute a beamforming weight vector from the covariance matrix, wherein the beamforming weight vector is for use with the plurality of antennas to null interference represented by the first interference spatial signature.

9. The apparatus of claim 8, wherein the signal processing module is configured to generate the second interference spatial signature by generating two or more second vectors, each of which is a difference between two consecutive first vectors of the interference signal matrix, calculating two or more norms of the two or more second vectors and an interference spatial signature norm which is an average of the two or more norms, and generating the second interference spatial signature from the two or more norms of the two or more second vectors and the interference spatial signature norm.

10. The apparatus of claim 9, wherein the signal processing module is further configured to generate a set of the second vectors that has one fewer element than a set of the first vectors.

11. The apparatus of claim 9, wherein the signal processing module is further configured to generate a first vector representing a last interference spatial signature.

12. The apparatus of claim 9, wherein the signal processing module is configured to select the set of third vectors that are most evenly spread over the two-dimensional space by selecting the set of third vectors with the maximum Euclidian distance between each vector and the rest of the two or more third vectors calculated as $$\sum_{i=1}^{m} \sum_{j=1, j \neq i}^{m} \|V_i - V_j\|,$$

where $V_i$ represents the two or more third vectors.

13. The apparatus of claim 8, wherein the signal processing module is configured to derive the second interference spatial signature by generating at least one set of two or more third vectors of interference derivative spatial signatures employing vector operations and forming a first matrix of two or more third vectors such that the norm of each third vector equals one and the norm of the difference between each third vector and one of the first vectors equals the interference spatial signature norm, and selecting a set of third vectors which are most evenly spread over a two-dimensional space.

14. The apparatus of claim 8, wherein the signal processing module is configured to generate the beamforming weight vector to produce a beam pattern having a dominant beam rotated by a rotation angle such that a nulling angle of the beam pattern is sufficiently wide to ensure that a direction of arrival of the interference signals falls outside the dominant beam.

15. A method comprising:

at a wireless communications device, receiving signals at a plurality of antennas and generating a first interference spatial signature from an interference signal matrix derived from interference signals received by the plurality of antennas;

computing a second interference spatial signature from the first interference spatial signature based on differences between consecutive vectors of the interference signal matrix;

calculating a covariance matrix from the second interference spatial signature; and generating a beamforming weighting vector from the covariance matrix for use with the plurality of antennas of the wireless communication device to produce a beam pattern having a dominant beam rotated by a rotation angle such that a nulling angle of the beam pattern is sufficiently wide to ensure that a direction of arrival of the interference signals falls outside the dominant beam.

16. The method of claim 15, wherein computing the second interference spatial signature comprises:

generating two or more second vectors, each of which is a difference between two consecutive first vectors of the interference signal matrix;

calculating two or more norms of the two or more second vectors and an interference spatial signature norm as an average of the two or more norms;

generating the second interference spatial signature from the two or more norms of the two or more second vectors and the interference spatial signature norm.

17. The method of claim 16, wherein selecting comprises selecting a set of third vectors which are most evenly spread over a two-dimensional space.

18. The method of claim 17, wherein selecting the set of third vectors that are most evenly spread over the two-dimensional space comprises selecting the set of third vectors with the maximum Euclidian distance between each vector and the rest of the two or more third vectors calculated as $$\sum_{i=1}^{m} \sum_{j=1, j\neq i}^{m} \|V_i - V_j\|,$$

where $V_i$ represents the two or more third vectors.

19. The method of claim 16, wherein computing the second interference spatial signature further comprises:

generating at least one set of two or more third vectors of interference derivative spatial signatures employing vector operations and forming a matrix of two or more third vectors such that the norm of each third vector equals one and the norm of the difference between each third vector and one of the first vectors equals the interference spatial signature norm; and selecting a set of third vectors based on one or more criteria derived from the norm of the two or more second vectors and the interference spatial signature norm.

* * * * *